(12) United States Patent
Boecking

(10) Patent No.: US 6,460,779 B1
(45) Date of Patent: Oct. 8, 2002

(54) FUEL INJECTION VALVE

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/787,968

(22) PCT Filed: Mar. 24, 1999

(86) PCT No.: PCT/DE99/00865

§ 371 (c)(1),
(2), (4) Date: May 15, 2001

(87) PCT Pub. No.: WO00/17510

PCT Pub. Date: Mar. 30, 2000

(30) Foreign Application Priority Data

Sep. 23, 1998 (DE) .......................................... 198 43 534

(51) Int. Cl.$^7$ ................................................. B05B 1/08
(52) U.S. Cl. ................................ 239/102.2; 239/533.9; 239/584; 239/92; 251/129.06; 251/57
(58) Field of Search ......................... 239/102.2, 88–92, 239/533.2–533.12, 584; 123/498; 251/129.06, 129.07, 57

(56) References Cited

U.S. PATENT DOCUMENTS

| 4,101,076 A | 7/1978 | Bart | |
| 4,803,393 A | 2/1989 | Takahashi | |
| 4,909,440 A | * 3/1990 | Mitsuyasu et al. | ..... 251/129.07 |
| 5,630,550 A | * 5/1997 | Kurishige et al. | ........ 239/533.8 |
| 6,142,443 A | * 11/2000 | Potschin et al. | ......... 239/102.2 |

FOREIGN PATENT DOCUMENTS

| DE | 43 06 073 | | 6/1994 |
| DE | 4306072 A1 | * | 9/1994 |
| DE | 195 00 706 | | 7/1996 |
| DE | 196 50 900 | | 6/1998 |
| DE | 197 24 637 | | 12/1998 |
| DE | 19939451 A1 | * | 11/2000 |
| EP | 0 790 402 | | 8/1997 |
| EP | 0 864 743 | | 9/1998 |
| EP | WO 01/14732 A1 | * | 8/2000 |
| JP | 362291462 A | * | 12/1987 |

* cited by examiner

Primary Examiner—Lesley D. Morris
Assistant Examiner—Dinh Q. Nguyen
(74) Attorney, Agent, or Firm—Kenyon & Kenyon

(57) ABSTRACT

A fuel injector, especially an injector for fuel injection systems in internal combustion engines, has a piezoelectric or magnetostrictive actuator. The actuator, via a valve needle, activates a valve-closure member, which cooperates with a valve seat surface to form a sealing seat. The actuator can be actuated in a first direction of motion. In contrast, the valve-closure member can be moved by the valve needle in a second direction of motion (40) that is essentially perpendicular to the first direction of motion.

6 Claims, 2 Drawing Sheets

FUEL INJECTION VALVE

FIELD OF THE INVENTION

The present invention relates to a fuel injector.

BACKGROUND INFORMATION

U.S. Pat. No. 4,803,393 describes a fuel injector known for fuel injection systems in internal combustion engines, which is executed using a piezoelectric actuator. Using the actuator, a valve-closure member, which cooperates with a valve seat surface forming a sealing seat, can be actuated via a valve needle. The actuator can be actuated in a first direction of motion, and the valve-closure member can be moved by the valve needle in a second direction of motion that is essentially perpendicular to the first direction of motion. Between the actuator and the valve needle, a hydraulic transmission device is provided, the actuator being connected, via a first transmission piston, to a transmission chamber of the transmission device, the chamber being filled with a hydraulic fluid and being essentially bent in an L-shape, and the valve needle being connected thereto via a second transmission piston. The known fuel injector can only be used as a so-called inward-opening fuel injector.

German Published Patent Application No. 195 00 706, describes a fuel injector. In the fuel injector described in this publication, a piezoelectric actuator is provided for actuating a valve needle connected to a valve-closure member. The valve-closure member cooperates with a valve seat surface to form a sealing seat. In this context, both an embodiment as a fuel injector opening to the outside as well as an embodiment as a fuel injector opening to the inside are possible. Although the piezoelectric actuator, assembled from a plurality of piezoelectric layers arranged in a stack, generates relatively strong lifting forces, it nevertheless generates relatively short valve travels. In the above-mentioned printed publication, it is therefore proposed to provide a hydraulic transmission device to increase the valve travel, between the valve needle and the piezoelectric actuator, transmitted to the valve needle.

One disadvantage in this known design is that, on the basis of the actuating elements, arranged serially one after the other, and made up of the piezoelectric actuator, the hydraulic transmission device having the transmission pistons, and the valve needle, the resulting design is relatively elongated. The known fuel injector therefore extends relatively far out of the cylinder head of an internal combustion engine, which is unfavorable for the assembly process, especially if the internal combustion engine is one that has four valves and only one camshaft.

In addition, it is disadvantageous that, for the transmission device, a special hydraulic fluid is used, which can escape due to leakage loss occurring over time. This can impair the mode of functioning of the transmission device and the service life of the fuel injector.

German Patent No. 43 06 073 describes a fuel injector having a piezoelectric actuator of a different design. In this fuel injector, a transformation of the motion of the piezoelectric actuator to the motion of the valve needle also occurs by way of a hydraulic transmission device. In the fuel injector known from this printed publication, the piezoelectric actuator, a lifting piston cooperating with the transmission device, and the valve needle are arranged serially one after the other, so that the resulting type of construction is relatively long. In addition, the potential leakage loss of the hydraulic fluid is disadvantageous here as well.

SUMMARY OF THE INVENTION

In contrast, the fuel injector according to the present invention has the advantage that, due to the bent, lateral arrangement of the actuator, the result is a smaller longitudinal extension in the fuel injector according to the present invention. In this context, the actuating direction of the actuator runs essentially perpendicular to the movement direction of the valve-closure member and of the valve needle. As a result of the lateral arrangement of the actuator, the fuel injector protrudes from the cylinder head less than in the case of the fuel injectors known from the related art, so that the installation space for the camshaft, intake and outlet valves, a spark plug, and other components of the internal combustion engine is not reduced. Especially in an internal combustion engine having four or more valves per combustion chamber and only one camshaft, there is, for the fuel injectors, only a limited installation space available, which is used in the design according to the present invention in a space-saving manner.

The change in the direction of motion of the actuator, which is actuated perpendicular to the direction of motion of the valve-closure member, is advantageously effected by a hydraulic transmission device. The hydraulic transmission device, in this context, fulfills a double function: first, it is used for transforming the lift, in order to transform the relatively small actuating lift of the actuator into a relatively large lift of the valve-closure member; second, it is used to change the direction of motion from the direction of motion of the actuator to the direction of motion of the valve needle and of the valve-closure member, which are perpendicular to the former.

It is advantageous in this context that the hydraulic transmission device is configured such that a transmission chamber filled with a hydraulic fluid is bent in an L-shape. In this context, a first transmission piston actuated by the actuator is connected to a first arm of the transmission chamber, and a second transmission piston acting on the valve needle is connected to a second arm of the transmission chamber. If the fuel injector is one that opens to the inside, the second arm of the transmission chamber is advantageously situated on the side of the second transmission piston facing the valve-closure member, in order to generate a lifting motion directed to the inside. Conversely, the second arm of the transmission chamber is situated advantageously on the side of the transmission piston facing the valve-closure member, if the fuel injector is one that opens to the outside.

The fuel supplied to the fuel injector and spray-discharged by the fuel injector is used as the hydraulic fluid for the transmission device. Therefore, no special hydraulic fluid, for example, a hydraulic oil, needs to be put into the fuel injector, which could escape due to leakage loss over time. Rather, a quasi-static fuel is continually replenished as the hydraulic fluid, automatically via guide apertures.

A biasing element advantageously surrounds the actuator in a sleeve-like manner. In comparison to a serial arrangement of the biasing element and the actuator, this increases the compactness of the fuel injector according to the present invention.

The valve needle is preferably composed of two valve needle segments, a first valve needle segment being designed as a single piece so as to include one of the transmission pistons, and the other valve needle segment is configured as a single piece so as to include the valve-closure member. The two valve needle segments can be connected by a coupling piece in a simple fashion. This makes assembly of the fuel injector according to the present invention significantly simpler.

DETAILED DESCRIPTION

Figure 1:
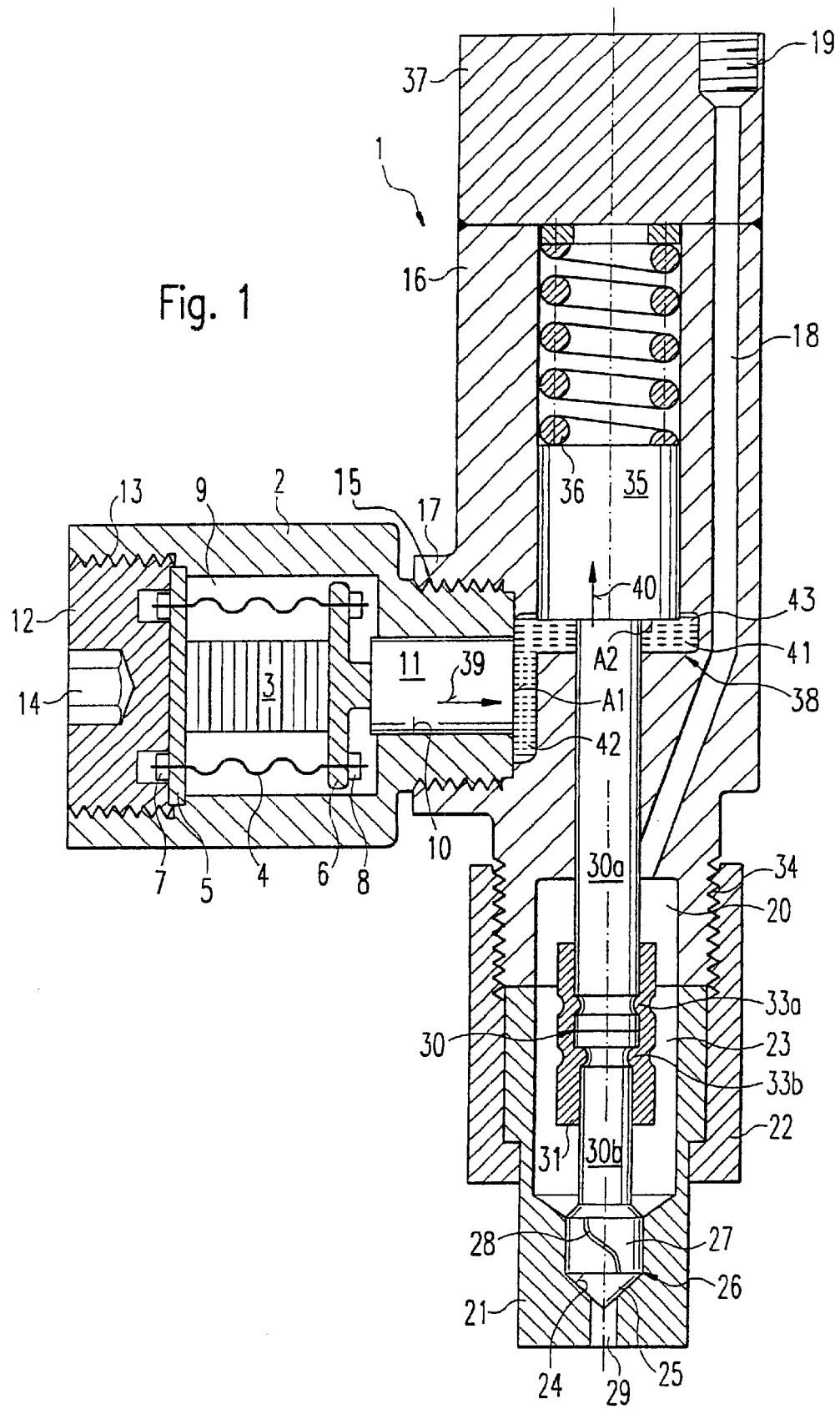
FIG. 1 depicts an axial cutaway view of a first exemplary embodiment of a fuel injector according to the present invention.

FIG. 1, in an axial section representation, depicts a first exemplary embodiment of fuel injector 1 according to the present invention. Fuel injector 1 is especially suited for directly injecting fuel, in particular gasoline, into the combustion chamber preferably of a mixture-compressing, spark-ignited internal combustion engine.

Fuel injector 1 according to the present invention has a first housing body 2, in which a piezoelectric actuator 3 is integrated. Piezoelectric actuator 3 is composed of a plurality of plates, arranged in a stack and made of a piezoelectric material. The plates are each provided with electrodes, which can be connected to two poles of an electrical power source, such that the electrical field direction in each of the plates runs in the same axial direction. Of course, instead of a piezoelectric actuator, a magnetostrictive actuator can also be used in the same way. Piezoelectric actuator 3 is supported, so as to be mechanically biased, by a biasing element 4, which surrounds piezoelectric actuator 3 in a sleeve-like manner, through two tension springs. Piezoelectric actuator 3 is gripped between a first actuator flange 5 and a second actuator flange 6, sleeve-like biasing element 4 being connected, via fastening elements 7 and 8, to first actuator flange 5 or to second actuator flange 6 in a force-locking manner. Piezoelectric actuator 3, biasing element 4, and both actuator flanges 5 and 6 are inserted into a first cylindrical recess 9 of first housing body 2. In a second cylindrical recess 10, which is connected to first cylindrical recess 9, a first transmission piston 11, to be describing greater detail below, is inserted. The axial position of actuator 3, actuator flanges 5 and 6, and first transmission piston 11, which is axially impacted upon by second actuator flange 6, can be adjusted using an adjusting element 12, which is connected via a thread 13 to first housing body 2 and which at the same time constitutes the external termination of recess 9. The axial adjustment of adjustment element 12 is performed by being twisted using a tool that can be inserted into a tool depression 14.

First housing body 2 is bolted to a second housing body 16 via a thread 15, second housing body 16 having a lateral receptacle 17, so that first housing body 2 can be screwed in. In second housing body 16, a fuel supply line 18 is integrated, which leads from a fuel intake feed pipe 19 to a recess 20. Disposed at the end opposite fuel intake feed pipe 19 is a valve seat body 21, which is biased against second housing body 16 by a tightening nut 22, so that a recess 23 of valve seat body 21 is connected to recess 20 of second housing body 16.

On valve seat body 21, a truncated-cone-shaped valve seat surface 24 is formed, which cooperates with a conical segment 25 of a valve-closure member 26 forming a sealing seat. A cylindrical section 27 of valve-closure member 26 is provided with at least one swirl groove 28, which assures an optimal distribution of the fuel. Connected to valve-closure member 26 is a spray-discharged opening 29 in valve seat body 21.

Valve-closure member 26 is actuated by a valve needle 30, which in the depicted exemplary embodiment is composed of a first valve needle segment 30a, configured as a single piece so as to include a second transmission piston 35, and a second valve needle segment 30b, which is configured as a single piece so as to include valve-closure member 26.

First valve needle segment 30a and second valve needle segment 30b are connected to each other by a coupling piece 31. In this context, first valve needle segment 30a and second valve needle segment 30b have a groove 33a and 33b, respectively, into which coupling piece 31 is snapped, thus forming a form-locking connection between first valve needle segment 30a and second valve needle segment 30b. In this context, first valve real segment 30a can be preassembled on second housing body 16, and fuel injector 1 can be assembled by first adding second valve needle segment 30b having valve-closure member 26 to first valve needle segment 30a and connecting it to coupling piece 31. Finally, valve seat body 21 can be mounted and can be biased with regard to second housing body 16 using tightening nut 22 via thread 34.

For the resetting of valve needle 30 and valve-closure member 26, there is a resetting spring 36, which is fixed between second transmission piston 35 and a cover element 37 of second housing body 16.

First transmission piston 11 and second transmission piston 35 are parts of a transmission device 38. Transmission device 38, in addition to two transmission pistons 11 and 35, includes a transmission chamber 41, which is filled with a hydraulic fluid. In this context, first transmission piston 11, which is in an operative connection with actuator 3, borders on transmission chamber 41 at a first surface A1, which is dimensioned so as to be larger than a second surface A2, at which second transmission piston 35, which is in connection with valve needle 30, borders on transmission chamber 41.

The functioning of fuel injector 1 according to the present invention is as follows:

By acting upon piezoelectric actuator 3 through an electrical actuation voltage, the actuator expands axially and, via second actuator flange 6, moves first transmission piston 11 in FIG. 1 to the right, in a first direction of motion 39. Transmission device 38 transforms this first direction of motion 39 into a second direction of motion 40, perpendicular to the first, of valve needle 30 and valve-closure member 26. In this context, first transmission piston 11 presses the hydraulic fluid located in transmission chamber 41, such that second transmission piston 35, and therefore valve needle 30 and valve-closure member 26 in FIG. 1, are moved upwards. Since surface A1 of first transmission piston 11 is dimensioned so as to be larger than surface A2 of second transmission piston 35, the valve lift transmitted to valve needle 30 is larger than the actuating lift exerted by actuator 3.

Transmission device 38, in this context, has two functions: first, redirecting first direction of motion 39 into a direction of motion 40, perpendicular to the first, and, second, transforming the relatively small actuating lift of actuator 3 into the increased valve lift of valve needle 30 and valve-closure member 26.

In the exemplary embodiment depicted, transmission chamber 41 is configured so as to be bent in an L-shape. In this context, transmission chamber 41 has a first arm 42, which is connected to first transmission piston 11, and a second arm 43, which is connected to second transmission piston 35. This design of transmission chamber 41 has the advantage that the volume of transmission chamber 41 is small.

Since fuel injector 1, according to the exemplary embodiment depicted in FIG. 1, is one that opens to the inside, second arm 43 of transmission chamber 41 is advantageously situated on the side of second transmission piston 35 that faces valve-closure member 26, in order to achieve a valve lift to the inside, i.e., in FIG. 1, upwards.

The hydraulic fluid located in transmission chamber 41 is preferably the fuel fed from fuel intake feed pipe 19 via fuel supply line 18, recesses 20 and 23, and swirl groove 28, to the sealing seat formed by valve-closure member 26 and valve seat surface 24. The fuel can be replenished in a quasi-static manner in transmission chamber 41 via a guide aperture between second housing body 16 and first valve needle segment 30a. Of course, this guide aperture should be dimensioned so as to be small enough that when fuel injector 1 is actuated, the fuel, operating as the hydraulic fluid, cannot escape from transmission chamber 41 through this guide aperture, or does so in practically negligible amounts. Using the fuel as a hydraulic fluid has the advantage that a special hydraulic fluid, for example, a special hydraulic oil, is not necessary. In this context, no danger arises that a special hydraulic oil could contaminate the fuel. The possibility of losses due to leakage of the hydraulic fluid is compensated for by continual replenishment. The standing pressure of the fuel system should be greater than the vapor pressure of the fuel.

Figure 2:
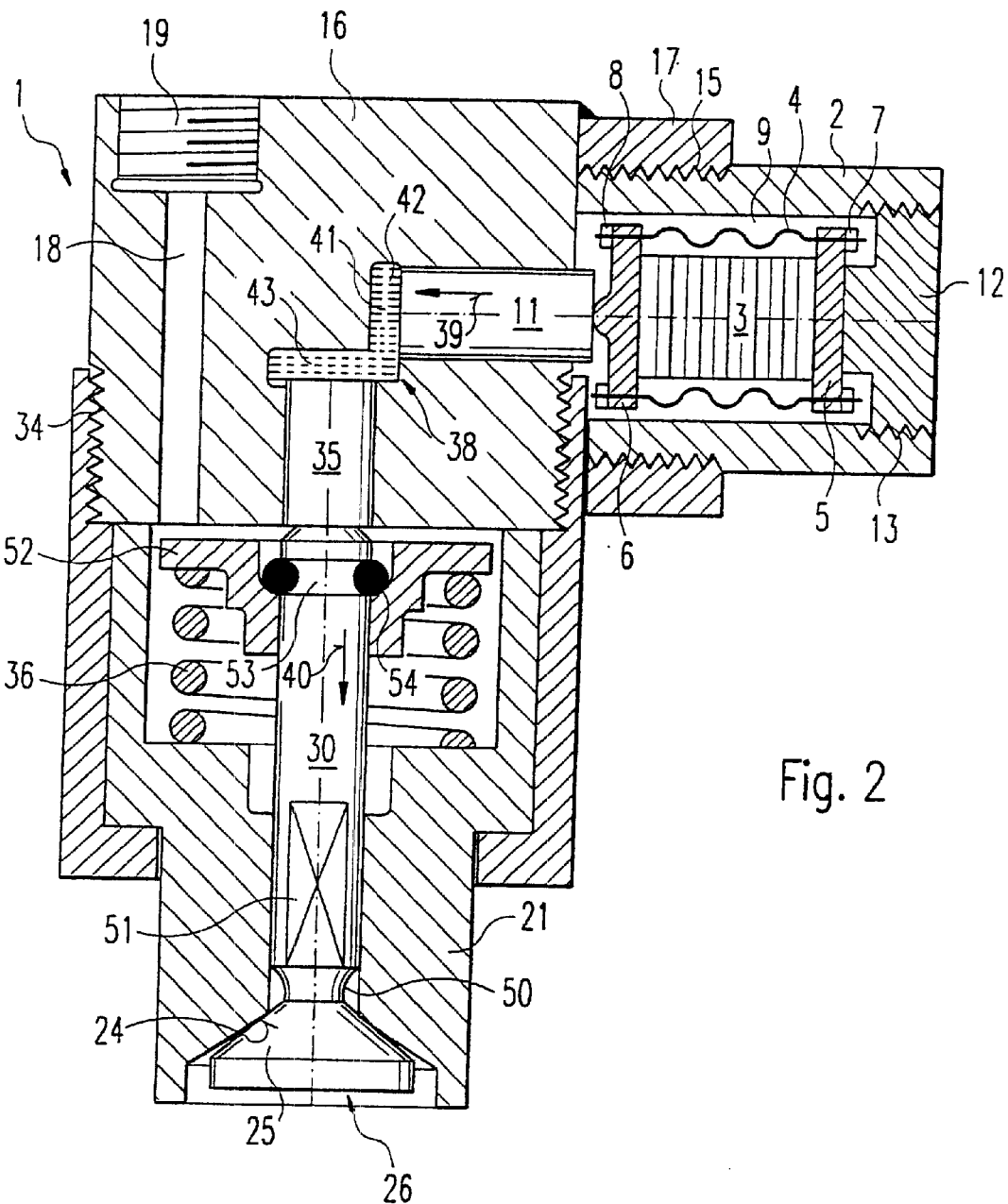
FIG. 2 depicts an axial cutaway view of a second exemplary embodiment of the fuel injector according to the present invention.

In FIG. 2, a second exemplary embodiment of a fuel injector 1 according to the present invention is depicted. In contrast to fuel injector 1, opening to the inside and depicted in FIG. 1, fuel injector 1 depicted in FIG. 2 is a fuel injector I that opens to the outside. Elements described on the basis of FIG. 1 are furnished with the same reference numerals, so that to this extent no repeat description is necessary.

Valve-closure member 26 is situated on the exterior side on valve seat body 21. Valve seat body 21 on its external side has a valve seat surface 24, which cooperates with a conical segment 25 of valve-closure member 26 forming a sealing seat. Upstream of conical segment 25, valve-closure member 26 has a constriction 50, which is connected via a flattened area 51 of valve needle 30 to a recess 23 of valve seat body 21. The fuel flows through a fuel intake feed pipe 19 and through fuel supply line 18 to recess 23 of valve seat body 21 and continues, via the aperture remaining between flattened area 51 and surrounding valve seat body 21, to the sealing seat formed by conical segment 25 of valve-closure member 26 and valve seat surface 24. In this context, valve-closure member 26 is biased against valve seat surface 24 by resetting spring 36. Resetting spring 36 engages at a flange 52, which presses against a locking ring 54, inserted into a groove 53 of valve needle 30, and which therefore is connected in a form-locking manner to valve needle 30.

Transmission chamber 41 of transmission device 38 is also configured in the exemplary embodiment depicted in FIG. 2 as bent in an L-shape, first transmission piston 11, in an operative connection with actuator 3 via the actuator flange 6, and second transmission piston 35, in an operative connection with valve needle 30, being connected to a second arm 43 of transmission chamber 41.

When actuator 3 is activated, it extends in the direction of housing body 16 and pushes first transmission piston 11 to the left, in accordance with first direction of motion 39 in FIG. 2. Since second arm 43 of transmission chamber 41 in the exemplary embodiment depicted in FIG. 2 is located on the side of second transmission piston 35 that is facing away from valve-closure member 26, second transmission piston 35 is pushed downwards, in accordance with second direction of motion 40 in FIG. 2. Second transmission piston 35, in this context, presses against valve needle 30 and pushes it downwards, together with valve-closure member 26 in FIG. 2, in order thus to open fuel injector 1. After the electrical power activating actuator 3 is switched off, valve needle 30 and valve-closure member 26, connected thereto, are reset by resetting spring 36, until valve-closure member 26 is again sealingly contacting valve seat surface 24.

A further difference in the exemplary embodiment depicted in FIG. 1 with respect to the exemplary embodiment depicted in FIG. 2 lies in the fact that first transmission piston 11 is integrated not in first housing body 2 but rather in second housing body 16.

To compensate for any leakage losses, in the exemplary embodiment depicted in FIG. 2, transmission chamber 41 is replenished through a narrow guide aperture between second transmission piston 35 and second housing body 16.

The present invention is not limited to the exemplary embodiments depicted. For example, instead of a piezoelectric actuator 3, a magnetostrictive actuator can be used in the same manner.

What is claimed is:

1. A fuel injector, comprising:
   one of a piezoelectric actuator and a magnetostrictive actuator,
   a valve needle;
   a valve-closure member that is actuated by the one of the piezoelectric actuator and the magnetostrictive actuator via the valve needle;
   a valve seat surface with which the one of the piezoelectric actuator and the magnetostrictive actuator cooperates to form a sealing seat, wherein:
      the one of the piezoelectric actuator and the magnetostrictive actuator is capable of being actuated in a first direction of motion, and
      the valve-closure member is capable of being moved by the valve needle in a second direction of motion that is essentially perpendicular to the first direction of motion;
   a hydraulic transmission device arranged between the one of the piezoelectric actuator and the magnetostrictive actuator and the valve needle;
   a first transmission piston via which the one of the piezoelectric actuator and the magnetostrictive actuator is connected to a transmission chamber of the hydraulic transmission device; and
   a second transmission piston via which the valve needle is connected to the transmission chamber; wherein:
      the transmission chamber is filled with a hydraulic medium and is essentially bent in an L-shape,
      a first surface of the first transmission piston, at which the first transmission piston is connected to a first arm of the transmission chamber, is larger than a second surface of the second transmission piston, at which the second transmission piston is connected to a second arm of the transmission chamber,
      the fuel injector opens to the outside, and
      the second arm is arranged on a side of the second transmission piston that is facing away from the valve-closure member.

2. The fuel injector according to claim 1, wherein:
   the fuel injector corresponds to an injector for a fuel injection system in an internal combustion engine.

3. The fuel injector according to claim 1, further comprising:
   a flange connected to one of the valve needle and to the second transmission piston; and
   a resetting spring engaged with the flange.

4. The fuel injector according to claim 1, wherein:
   a fuel that is supplied in the fuel injector to the sealing seat corresponds to a hydraulic fluid with which the transmission chamber is filled.

5. The fuel injector according to claim 1, further comprising:

a biasing element surrounding the one of the piezoelectric actuator and the magnetostrictive actuator in a sleeve-like manner.

6. The fuel injector according to claim 1, further comprising:

a coupling piece, wherein:

the valve needle includes:

a first valve needle segment configured as a single piece so as to include the second transmission piston, and a second valve needle segment configured as another single piece so as to include the valve-closure member, and the first valve needle segment is connected via the coupling piece to the second valve needle segment.

* * * * *